Nov. 27, 1945.　　A. H. R. FEDDEN ET AL　　2,389,778
POWER PLANT FOR AIRCRAFT
Filed Jan. 14, 1942　　5 Sheets-Sheet 4

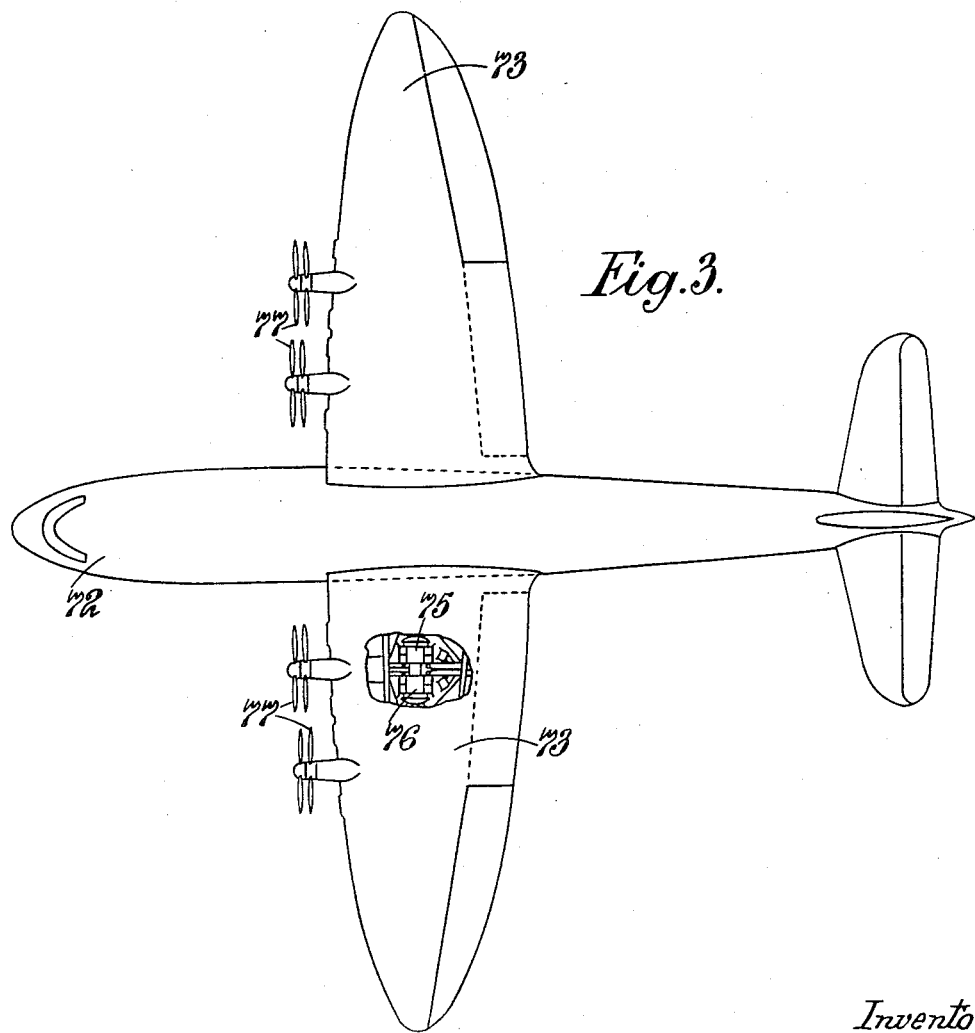

Inventors
Alfred H. R. Fedden
Frank M. Owner
Frederick M. Thomas
and Stanley W. Mansell
by Wilkinson & Mawhinney
Attorneys.

Nov. 27, 1945.  A. H. R. FEDDEN ET AL  2,389,778
POWER PLANT FOR AIRCRAFT
Filed Jan. 14, 1942  5 Sheets-Sheet 5

Inventors
Alfred H. R. Fedden
Frank M. Owner
by Wilkinson & Mawhinney
Attorneys

Patented Nov. 27, 1945

2,389,778

UNITED STATES PATENT OFFICE 2,389,778

POWER PLANT FOR AIRCRAFT

Alfred Hubert Roy Fedden and Frank Morgan Owner, Bristol, England, Frederick Metcalf Thomas, North Adams, Mass., and Stanley Walter Mansell, Bristol, England, assignors to The Bristol Aeroplane Company Limited, Bristol, England, a British company Application January 14, 1942, Serial No. 426,778
In Great Britain January 17, 1941

1 Claim. (Cl. 74—389)

This invention relates to power plants for aircraft and has for its object to provide an improved construction and arrangement of transmission gearing enabling two engines to be used to drive two or more air-screws in various combinations. The two engines are arranged with their crankshaft axes parallel and preferably coaxial, and the drive is transmitted from them to air-screws which are spaced away laterally from the engine axes.

Preferably two exactly similar engines are used set face-to-face so that their crankshafts rotate in opposite directions, thereby reducing to a minimum any torque-reaction or gyroscopic effects.

According to this invention there is provided in a power plant for an aircraft, the combination with engines and airscrews arranged as above set forth, of means for engaging and disengaging either or both engines from both airscrews.

According to another feature of this invention there is provided the combination with the engines and gearing interconnecting them, of means for engaging and disengaging said gearing from either or both the laterally extending shafts to the airscrews.

According to a further feature of this invention means is provided for automatically disengaging the drive between the engines and the airscrews when the latter overrun the former. Preferably the said means is interconnected with the throttle-lever and is maintained in the driving position until the throttle-lever has been opened to a predetermined extent.

This invention permits the possibility of each engine being started independently, or run independently for test purposes. Moreover, it is possible for one engine to be started from the other engine if the latter is running, and when starting an engine it is possible to couple it to an airscrew or airscrews so as to avoid any risk of the engine racing in cases where no other provision to meet this difficulty is made. In the event of one engine failing during flight it is automatically disengaged from the airscrews and the other engine continues to drive both or all the airscrews. Furthermore, an economical cruising speed can be obtained by disconnecting one engine and using the other engine to drive the airscrews at its most economical loading; in such conditions it is possible to re-engage when necessary the engine which is not running. When the aircraft is gliding and no power is being transmitted by the engines to the airscrews, the latter tend to over-run the engines and the drive between the engines and airscrews tends automatically to be disengaged. The driving connection is however maintained since, under these conditions the throttle is substantially closed.

Finally since both engines are coupled to both or all the airscrews, it is desirable to be able to disconnect an airscrew should it fail or be damaged in any manner, and this also is rendered possible by the construction according to the present invention.

In the accompanying drawings,

Figure 3 is a diagrammatic view showing the application of this invention to a large aircraft such as a flying boat, Figure 4 is a diagrammatic view of the power plant installation used on Figure 3, shown to a larger scale, Figure 5 is a sectional view on the line 5—5 of Figure 4

Figure 1:
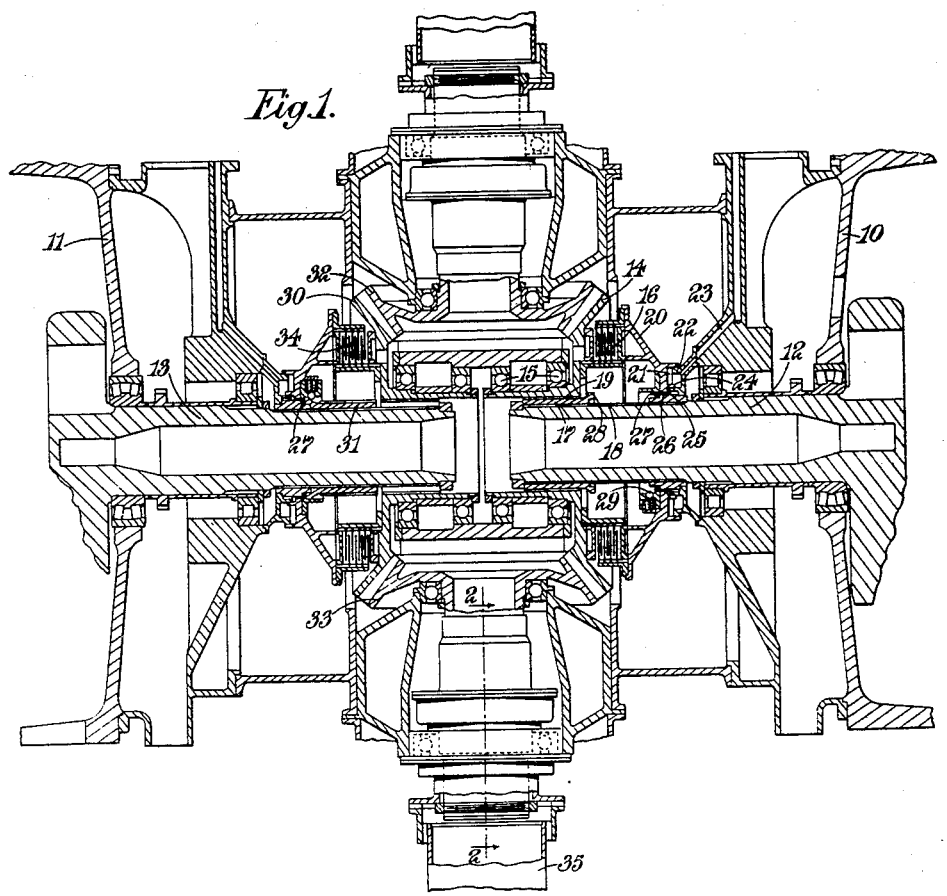
Figure 1 is a central sectional view showing the gearing connecting the two engines and its connection to the laterally-extending shafts which drive the airscrews.

Referring first to Figure 1, a portion of the casing of each of two engines set face-to-face is indicated at 10, 11 respectively with the crankshafts 12, 13 extending therefrom towards one another. A bevel-gear 14 is mounted independently of the crankshaft 12 on bearings 15 and it can be coupled thereto by a friction-clutch 16 or positively engaged therewith by a sleeve 17 which is formed with internal axial splines to engage splines 18 on the crankshaft, and with external helical splines 19 which engage internal helical splines on the bevel-gear. The sleeve 17 is capable of axial movement along the splines 18, and the helical splines 19 are so directed that the sleeve is self-engaging when the engine is running; the sleeve is thereby held in its engaging position so long as the engine is driving the bevel-gear. When however the airscrews which are driven from the bevel-gear 14 over-run the engine, the sleeve 17 is automatically disengaged from the bevel-gear 14 by the helical splines. The function of the friction-clutch 16 is to bring about synchronism of speed between the engine and the bevel-gear prior to the engagement of the positive drive.

The friction-clutch 16 and positive-clutch 17 are both hydraulically controlled by oil under pressure driven from an engine-driven pump and for this purpose one set of the friction-plates of the clutch 16 is carried by an annular member 20 surrounding the crankshaft and the other set is carried by the bevel-gear 14. The annular member 20 is formed on its outer face with a dished recess 21 which receives an annular piston-like member 22 and the supply of oil under pressure is delivered through a duct 23 which opens into the member 22. The space 21 is bounded on its inner periphery by flanges on the member 20 and piston-like member 22 as shown at 24, and these flanges are of such axial length that when oil pressure is admitted to the chamber 21 to press the member 20 towards the left and engage the friction-clutch 16, the two flanges 24 separate and admit the pressure-oil to the space 25 from which it passes by the duct 26 to a space 27. When the clutch-sleeve 17 is in its disengaging position, its end 28 lies within the space 27 and constitutes a piston-like member therein so that the application of oil under pressure to it forces it towards the left until, at its left-hand end, the helical splines 19 enter into engagement, and thereafter the sleeve is drawn into full driving engagement with the bevel-gear. When the sleeve 17 is in its disengaged position it is retained therein by a spring-pressed ball 29 which retains it except when oil pressure is applied to move it.

The other crankshaft 13 is provided with a bevel-gear 30 and coupled thereto by mechanism exactly similar to that already described for the shaft 12 and gear 14, but in this case the positive driving sleeve 31 is shown in its disengaged position.

The two bevel-gears 14 and 30 are exactly similar and they both mesh at opposite ends of a diameter with bevel-pinions 32, 33 respectively by which a drive is transmitted to each of the laterally-extending shafts for the airscrews as hereinafter described.

The operation of the mechanism so far described is as follows:

When it is desired to couple an engine to the laterally-extending shafts, oil under pressure is admitted by the passage 23 to the dished recess 21 to displace the member 20 which slides on the piston-like member 22 and thereby brings the plates of the clutch 16 into frictional engagement with one another. A drive is thereby imparted to the bevel-gear 14 (or 30 as the case may be) thereby synchronising the gear with the crankshaft. The movement of the member 20 when completed disengages the flanges 24 and admits the pressure-oil to the space 27 so as to initiate the movement of the clutch-sleeve 17 against the retaining action of the spring-pressed ball 29, to bring the helical splines 19 into engagement, and then, as stated above, the sleeve is drawn into full driving engagement and the bevel-gear 14 is positively coupled to the shaft 12. The oil in the chamber 27 can escape through radial holes therein after the end 28 of the sleeve 17 has moved a sufficient distance to engage the splines 19, and finally can escape freely from the end of the space 27. Upon release of the oil-pressure, the friction-clutch 16 returns to its disengaged position.

With this hydraulic clutch control, it is possible to start an engine by its electric or other starter, whilst it is disconnected to the airscrews so that there is no load upon its except its own friction losses. The rotation of the engine drives the oil pump and builds up the necessary oil-pressure to effect engagement of the clutch when desired, as above described. It is therefore not essential that the engine should be running under its own power before the airscrews are engaged.

As stated above, the second engine is provided with exactly similar clutching arrangement whereby it may be engaged with its bevel-gear 30, but the hydraulic systems of the two engines are suitably interconnected so that when one engine is running, its oil-pressure may be used to engage the clutch of the stationary engine; assuming that the engine 10 is running and driving the bevel-gear 14 and bevel-pinion 32, the bevel-gear 30 is thereby driven and the admission of oil-pressure to the clutch system of the engine 11 engages its friction-clutch 34 which starts the engine 11 and finally positively engages it with its bevel-gear 30. Alternatively, of course the engine 11 may be started by means of its own electric or other starter if so desired.

As was stated above, the positive engagement between an engine and its bevel-gear is effected by means of the helical splines on the sleeve 17 and these are so arranged that in the event of an airscrew over-running an engine this clutch is automatically disconnected. This is necessary if one of the engines fails during flight, but it is undesirable that disengagement should take place when the aircraft is gliding, that is to say when the throttle is closed or substantially so. Accordingly, a valve is provided in the hydraulic system of each engine to control the supply of oil through the conduit 23 and each valve is connected with the throttle-lever of its associated engine in such a manner that the friction-clutch is maintained in its driving position until the throttle has been opened to a predetermined extent. The airscrews are therefore free from the engine or engines when the throttles are closed or substantially so.

Figure 2:
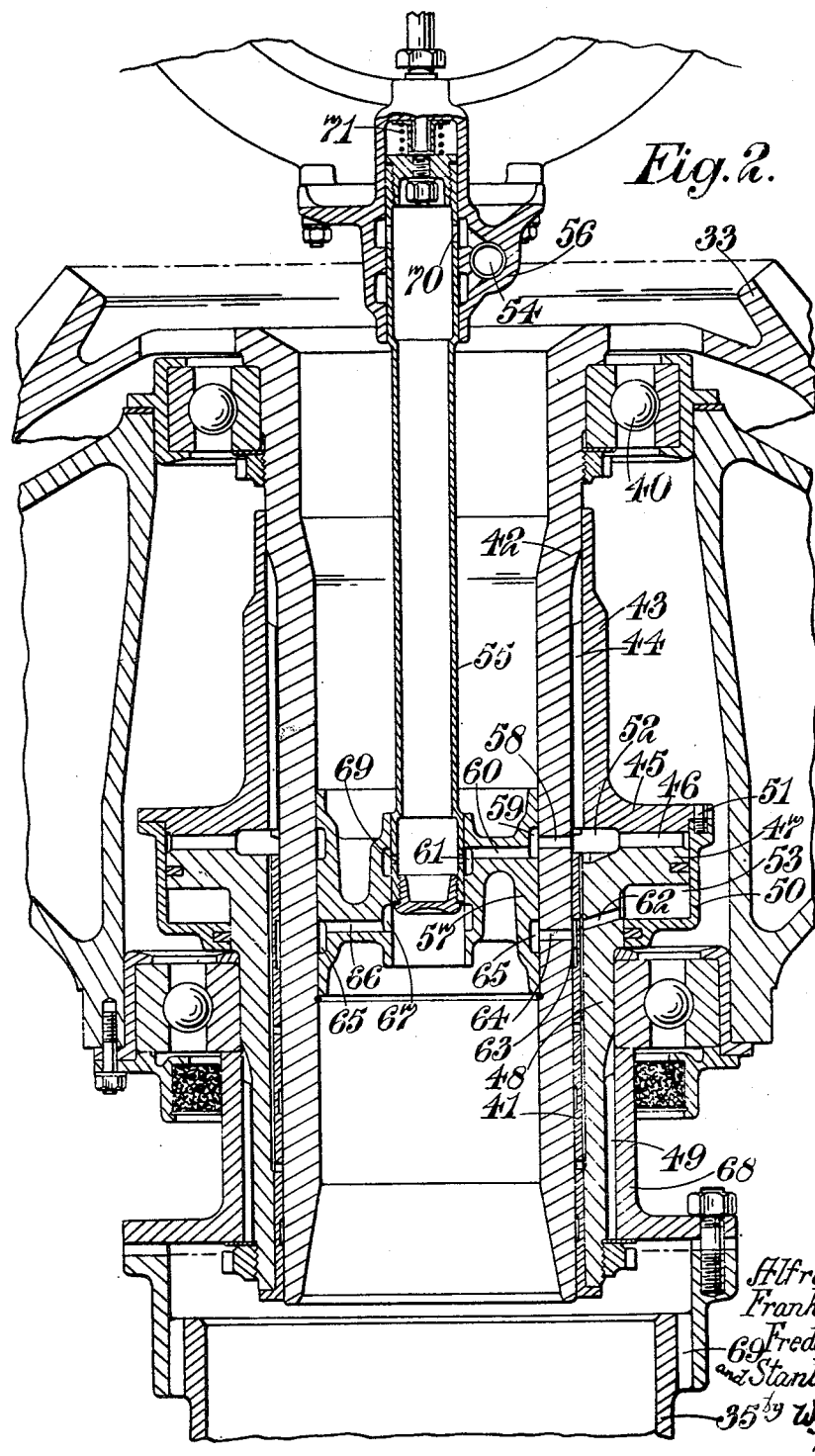
Figure 2 is a sectional view of a detail on the line 2—2 of Figure 1.
Figure 6:
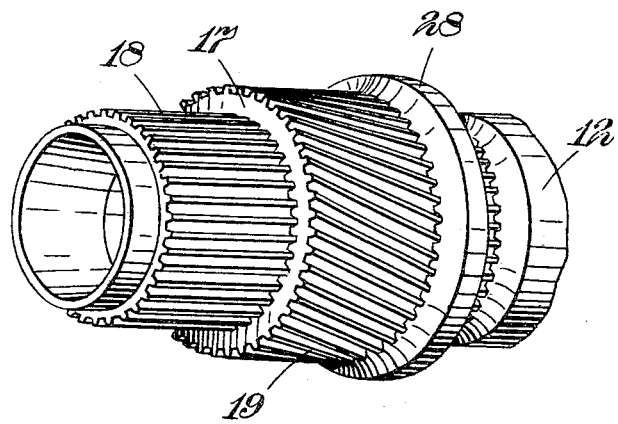
Figure 6 is a perspective view of a detail of the gearing shown in Figure 1.

As so far described a drive can be transmitted from the engine to the bevel-pinions 32, 33 and these drive laterally-extending shafts which transmit the drive to the airscrews as will now be described with reference to Figure 2. This drawing shows one of the bevel-pinions 33, at the top of the drawing, and at the bottom, the shaft 35 which it drives. It is desirable that it should be possible to disconnect the shaft 35 from the driving gear in the event of damage to an airscrew and a clutch mechanism is therefore provided between the bevel-pinion 33 and the shaft 35. The pinion 33 is formed integrally with a short shaft 42 which is mounted on a ball-bearing 40 and journal-bearing 41. A sleeve 43 is splined at 44 on to the shaft 42 and carries a flange 45 formed with teeth 46 on its outwardly directed face, to engage cooperating teeth formed on a flange 47 on a sleeve 48 mounted on the journal-bearing 41. The sleeve 48 is mounted in a suitable ball-bearing and has splined engagement at 49 with a sleeve 68 which drives through internal teeth 69 the shaft 35, this construction being used to provide a slight flexibility of the driving connection to the shaft.

The clutch-teeth 46 on the members 45, 47 above-mentioned are hydraulically controlled and for this purpose a dish-shaped member 50 encloses the toothed end of the shaft 48 and is secured by studs 51 to the flange 45. The member 47 therefore acts like a piston in the member 50 with a space 52 on one side and 53 on the other side.

A supply of high pressure-oil is provided by a conduit 54 (shown near the top of the drawing)

and the oil is directed to one or other of the chambers 52, 53 by means of a tubular valve member 55, which slides in a valve body 56 (whereto the oil is supplied) and in a second valve body 57. The chamber 52 communicates by radial ducts 58, an annular groove 59 and a radial duct 60 with a groove 61 on the inner face of the valve member 57, and the chamber 53 similarly communicates by a passage 62, groove 63, passage 64, groove 65 and passage 66 with a second groove 67 on the inner face of the valve member 57. The tubular valve member 55 is provided with radial ports 69 which can be brought into register by longitudinal movement of the member 55 with either of the annular recesses 61 or 67, and when in register with one of them it opens the other to the interior of the shaft 42 to allow the escape of oil thereto. The upper end of the valve tube 55 is provided with ports 70 which, in either position to which the valve 55 can be adjusted, open communication from the supply conduit 54 to the interior of the tube 55 and thence to one or other of the chambers 52, 53. When oil is supplied under pressure to the chamber 52, the sleeve 43 and cylinder member 50 are moved upwards disengaging the clutch teeth 46 and thereby disengaging the drive to the shaft 35. During this movement any oil in the space 53 escapes through a groove into the passage 62 and thence as described above to the interior of the shaft 42. When the control of the valve tube 55 is released, it is returned by a spring 71 at its upper end to its initial position thereby admitting oil to the chamber 53 and re-engaging the clutch-teeth 46.

The drive from the shaft 35 and the similar laterally-extending shaft on the other side of the engine axes is transmitted to the airscrews in any convenient manner depending upon the design of the aircraft. Thus the gearing hereinbefore described may be used for the power plant of an aircraft as described in the specification of concurrent British patent application No. 701/41, in which case the two engines are mounted within the fuselage with their crankshaft axes lying longitudinally thereof. The laterally-extending shafts 35 are arranged within the wings of the aircraft and at their outer ends a drive is transmitted to airscrew shafts lying parallel with the longitudinal axis of the aircraft. In this case the connection between the shaft 35, and the airscrew shaft is preferably of the kind described in the specification of concurrent British patent application No. 702/41. The transmission gearing, however, may also be used with other arrangements of aircraft as illustrated for example in Figures 3, 4 and 5.

In these drawings, Figure 3 illustrates diagrammatically the general lay-out of the aircraft comprising a fuselage 72 with laterally-extending wings 73; two pairs of engines are mounted in the manner above described within each of the wings, as indicated in Figure 4 and shown to a larger scale in Figure 4. The two engines of each pair are indicated respectively at 75, 76, and they are mounted with their axes normal to the longitudinal axis of the aircraft with the transmission gearing disposed between them. The laterally-extending shaft 35 extends forward beyond the leading edge of the wing to drive counter-rotating airscrews 77. Alternatively, a single airscrew can be used in this position or tractor airscrews can be used in front of the wing and a single pusher airscrew at the rear edge of the wing driven from the second laterally-extending shaft, or there could be two counter-rotating pusher airscrews at the trailing edge of the wing.

Each pair of engines is enclosed in a sealed cabin 78, access to which is provided through pressure doors so that the engines are accessible for attention during flight. Air inlet ducts 79 in the leading edge of the wing supply the air for the engine and cabin, and the cooling air is led in around the engine cylinders by means of a cylindrical cowl 80, flowing longitudinally of the engine axis into the space between the engines and thence by an outlet duct 81 to the trailing edge of the wing. The exhaust gases are carried out by tail pipes 82 situated in the duct 81, and preferably the general arrangements for cooling the engine are as described in the specifications of concurrent British patent applications Nos. 703/41, 704/41 and 705/41.

We claim:

In a power plant for aircraft, the combination with two engines each having a power shaft and arranged with the power shafts in line with one another, a pair of driving bevel gears coaxial with the power shafts and associated one with each power shaft, a pair of engine clutches associated one with each power shaft and arranged each to clutch its power shaft to the associated driving bevel gear, a pair of coaxial driven bevel gears each meshing with both driving bevel wheels, two coaxial airscrew shafts, coaxial with and associated one with each of the driven bevel gears, and a pair of airscrew clutches associated one with each airscrew shaft and arranged each to clutch its airscrew shaft to the associated driven bevel gears.

ALFRED HUBERT ROY FEDDEN.
FRANK MORGAN OWNER.
FREDERICK METCALF THOMAS.
STANLEY WALTER MANSELL.